United States Patent
Nishimura et al.

(10) Patent No.: US 12,464,092 B2
(45) Date of Patent: Nov. 4, 2025

(54) INFORMATION PROCESSING METHOD

(71) Applicants: TOYOTA JIDOSHA KABUSHIKI KAISHA, Aichi-ken (JP); NOMURA RESEARCH INSTITUTE, LTD., Tokyo (JP)

(72) Inventors: Kazuya Nishimura, Anjo (JP); Naoki Uenoyama, Kasugai (JP); Keiko Nakano, Kawasaki (JP); Yohei Nakanishi, Nagoya (JP); Takahiro Matsumura, Tokyo (JP)

(73) Assignees: TOYOTA JIDOSHA KABUSHIKI KAISHA, Aichi-Ken (JP); NOMURA RESEARCH INSTITUTE, LTD., Tokyo (JP)

( * ) Notice: Subject to any disclaimer, the term of this patent is extended or adjusted under 35 U.S.C. 154(b) by 20 days.

(21) Appl. No.: 18/764,099

(22) Filed: Jul. 3, 2024

(65) Prior Publication Data

US 2025/0016289 A1    Jan. 9, 2025

(30) Foreign Application Priority Data

Jul. 6, 2023   (JP) ................. 2023-111637

(51) Int. Cl.
   *H04N 7/18*   (2006.01)
   *G08B 21/02*   (2006.01)

(52) U.S. Cl.
   CPC ............. *H04N 7/181* (2013.01); *G08B 21/02* (2013.01)

(58) Field of Classification Search
   None
   See application file for complete search history.

(56) References Cited

U.S. PATENT DOCUMENTS

| | | | |
|---|---|---|---|
| 8,441,356 B1 * | 5/2013 | Tedesco | G08B 21/0453 340/539.15 |
| 2008/0225762 A1 * | 9/2008 | Soliman | H04L 63/30 370/310 |
| 2015/0356868 A1 * | 12/2015 | Cuende Alonso | G08G 1/0104 382/104 |

FOREIGN PATENT DOCUMENTS

| | | | | |
|---|---|---|---|---|
| CN | 105354982 B | * | 1/2018 | ......... G08B 21/0208 |
| CN | 108206932 A | * | 6/2018 | ............ G08B 19/00 |
| CN | 109413369 A | * | 3/2019 | ............. H04N 7/181 |
| CN | 107146376 B | * | 7/2019 | .............. G08B 21/02 |
| CN | 110070253 A | * | 7/2019 | ............ G07C 11/00 |
| CN | 110753208 A | * | 2/2020 | ............... H04N 5/76 |

(Continued)

*Primary Examiner* — Gelek W Topgyal
(74) *Attorney, Agent, or Firm* — HAUPTMAN HAM, LLP (57) ABSTRACT

An information processing method is performed using an information processing system including vehicles and a sever device. The method includes transmitting, using the communication unit of each vehicle, notification information set to the server device. The notification information set includes the peripheral image in which an elementary school student is captured and position information of the vehicle obtained when the peripheral image is generated by the image capturing unit. The method also includes sending, using the server device, at least one notification set among the notification information sets to an information terminal. The at least one notification information set includes a peripheral image in which an elementary school student who is away from a school route of the elementary school is captured, and the position information of the vehicle obtained when the peripheral image is generated by the image capturing unit.

4 Claims, 4 Drawing Sheets

(56) References Cited

FOREIGN PATENT DOCUMENTS

| | | | | |
|---|---|---|---|---|
| JP | 2016-066122 A | | 4/2016 | |
| KR | 20020020579 A | * | 3/2002 | ............. G08G 1/123 |
| KR | 2018075322 | * | 7/2018 | ............. G01S 19/01 |
| KR | 20200070837 A | * | 6/2020 | ......... G08B 21/0288 |
| KR | 20230078074 A | * | 6/2023 | ......... G08B 21/0484 |

* cited by examiner

INFORMATION PROCESSING METHOD

CROSS-REFERENCE TO RELATED APPLICATIONS

This application is based upon and claims the benefit of priority from prior Japanese Patent Application No. 2023-111637, filed on Jul. 6, 2023, the entire contents of which are incorporated herein by reference.

BACKGROUND

1. Field

The present disclosure relates to an information processing method.

2. Description of Related Art

As disclosed in Japanese Laid-Open Patent Publication No. 2016-066122, a device has been known that sends an alert email when the position of a mobile terminal carried by an elementary school student who commutes to school via a pre-registered school route is away from the school route.

The method disclosed in the above publication fails to determine whether an elementary school student is away from the school route if the elementary school student does not carry a mobile terminal.

SUMMARY

This summary is not intended to identify key features or essential features or essential features of the claim subject matter, nor is it intended to be included, an aid in determining the scope of the claim subject matter.

In one general aspect, an information processing method to be performed using an information processing system is provided. The information processing system includes vehicles and a server device installed outside the vehicles. The vehicles each include an image capturing unit that captures an image of surroundings to generate a peripheral image, a position information obtainment unit that obtains position information of the vehicle, and a communication unit that performs external communication. The information processing system is configured such that the peripheral image and the position information are transmitted from the communication unit of each vehicle to the server device via a communication network. The information processing method includes: transmitting, using the communication unit of each vehicle, a notification information set to the server device, the notification information set including the peripheral image in which an elementary school student is captured, and position information of the vehicle obtained when the peripheral image is generated by the image capturing unit; and sending, using the server device, at least one notification information set among the notification information sets to at least one of an information terminal belonging to an elementary school and an information terminal belonging to a staff member of the elementary school, the at least one notification information set including the peripheral image in which an elementary school student who is away from a school route of the elementary school is captured, and the position information of the vehicle obtained when the peripheral image is generated by the imaging unit.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Embodiment

Referring to FIGS. 1 to 4, an information processing method according to one embodiment is now described.

Overall Configuration of Information Processing System 1

Figure 1:
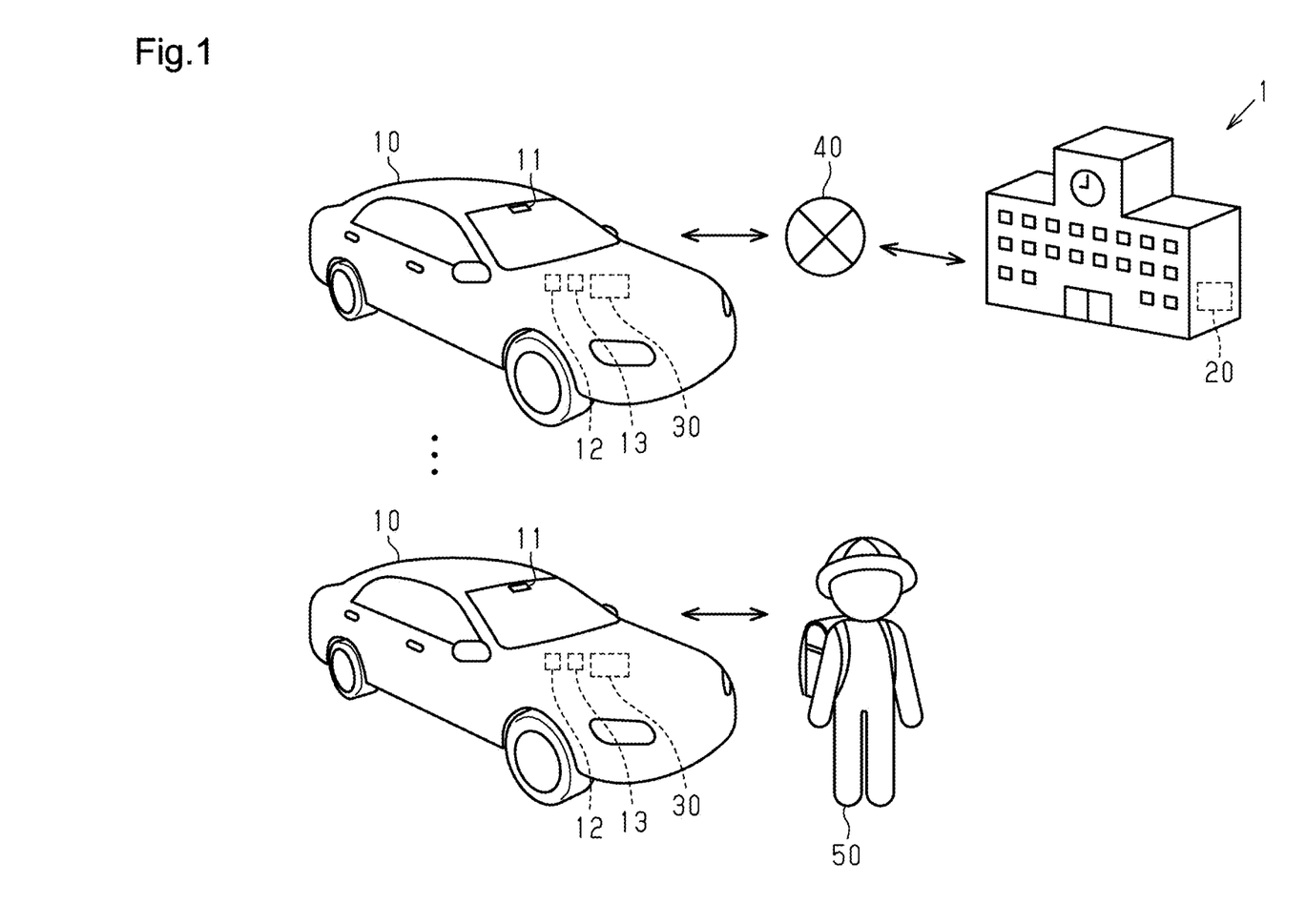
FIG. 1 is a diagram for illustrating an information processing system.

As shown in FIG. 1, an information processing system 1 that performs an information processing method may include one or more vehicles 10 and one or more server devices 20. Each vehicle 10 may include an image capturing unit 11, a position information obtainment unit 12, a sound obtainment unit 13, and a controller 30. The controller 30 and the server device 20 are connected via a communication network 40 so as to be able to transmit and receive information. Examples of the communication network 40 include the Internet, a wide area network (WAN), a local-area network (LAN), a provider terminal, a wireless communication network, a wireless base station, and a dedicated line.

The image capturing unit 11 may be a digital camera that uses a solid-state imaging element such as a charge-coupled device (CCD) or a complementary metal oxide semiconductor (CMOS). In one example, the image capturing unit 11 is a digital camera that forms a dashboard camera. The image capturing unit 11 captures images of the surroundings of the vehicle 10. The image capturing unit 11 can capture images of the front, rear, and sides of the vehicle 10 depending on the installation position of the image capturing unit 11 in the vehicle 10. The image capturing unit 11 captures an image of the surroundings of the vehicle 10 to generate peripheral images. When the vehicle 10 is traveling along a school route of an elementary school, peripheral images generated by the image capturing unit 11 may include an elementary school student 50. A school route is the path via which elementary school students 50 commute to school.

The position information obtainment unit 12 may be a global navigation satellite system (GNSS) receiver. The position information obtainment unit 12 identifies the position of the vehicle 10 based on the signals received from the GNSS satellites, and obtains position information indicating the position of the vehicle 10.

In one example, the sound obtainment unit 13 may be an acoustic device that converts input sound into an electrical signal and outputs the electrical signal. The sound obtainment unit 13 may be a single microphone. The sound obtainment unit 13 is attached to a given part of the vehicle 10. The sound obtainment unit 13 obtains sounds around the vehicle 10 and generates sound information.

When an elementary school student 50 is captured in a peripheral image generated by the image capturing unit 11 and the state of the elementary school student 50 satisfies various conditions, the controller 30 transmits information about the elementary school student 50 to the server device 20. The various conditions and the information transmitted by the controller 30 to the server device 20 will be described in detail below.

In one example, the server device 20 may output the information received from the controller 30 to an information terminal 60 provided in the elementary school and an information terminal 60 belonging to a staff member of the elementary school. This allows the elementary school staff to have information about the elementary school student 50. Examples of the information terminal 60 include a smartphone, a tablet terminal, and a personal computer.

Configuration of Controller 30

Figure 2:
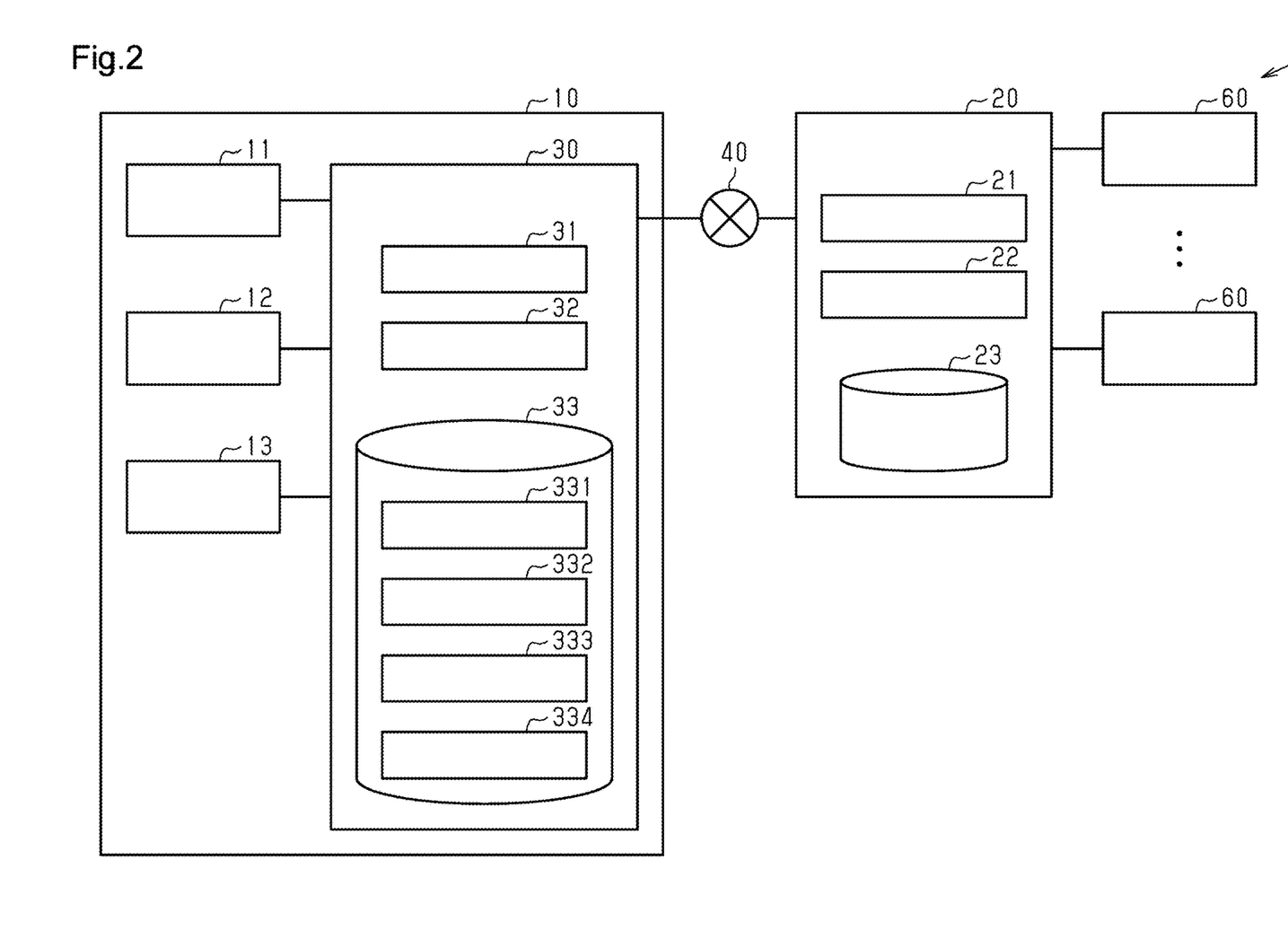
FIG. 2 is a diagram for illustrating a server device and a controller.

As shown in FIG. 2, the controller 30 may include processing circuitry 31, a communication unit 32, and a storage unit 33. The processing circuitry 31 may be a hardware processor such as a central processing unit (CPU). The hardware processor executes a program (software), enabling the processing circuitry 31 to perform various processes. The program may be stored in the storage unit 33 in advance. The storage unit 33 may be a non-transitory storage medium, such as a hard disk drive (HDD) or a flash memory. In one example, the communication unit 32 may include a communication circuit or a communication module, and transmit and receive various data to and from the server device 20 and other devices based on the control of the processing circuitry 31.

In one example, the storage unit 33 may store a trained model 331, school route information 332, hazardous area information 333, and reference sound information 334. The trained model 331 has undergone machine learning to determine whether an elementary school student 50 is captured in a peripheral image generated by the image capturing unit 11. In one example, the trained model 331 is a neural network. When a peripheral image is input as input variables to the trained model 331, the trained model 331 outputs an output variable indicating the probability that an elementary school student 50 is captured in the peripheral image. For example, the trained model 331 outputs, as the output variable, a value that is greater when the probability that an elementary school student 50 is captured in the peripheral image is higher. In this case, when the output variable is equal to or greater than a threshold, the processing circuitry 31 of the controller 30 determines that an elementary school student 50 is in the peripheral image. When the output variable is less than the threshold, the processing circuitry 31 determines that an elementary school student 50 is not in the peripheral image.

When an elementary school student 50 commutes to school, the student 50 carries a school backpack or wears a cap or uniform designated by the elementary school. The trained model 331 has been trained using machine learning so as to determine that an elementary school student 50 is captured in a peripheral image when a child who satisfies at least one of the following two conditions (A1) and (A2) is in the peripheral image.

(A1) Carrying a school backpack.
(A2) Wearing clothing designated by the elementary school.

The school route information 332 is information in which an elementary school is associated with position information indicating the school routes set within the school district of the elementary school.

The hazardous area information 333 is information in which an elementary school is associated with position information indicating hazardous areas within the school district of the elementary school. Hazardous areas are accident-prone areas. Examples of hazardous areas include areas near flood control facilities, such as rivers and reservoirs, roads with heavy traffic, and facilities where large vehicles frequently enter and exit.

The reference sound information 334 indicates the sound of a general personal alarm.

The processing circuitry 31 determines whether an elementary school student 50 is away from the school routes of the elementary school based on the peripheral image generated by the image capturing unit 11, the position information obtained by the position information obtainment unit 12, and the information stored in the storage unit 33.

Specifically, the processing circuitry 31 determines whether an elementary school student 50 is captured in a peripheral image based on the output variable of the trained model 331 obtained when the peripheral image generated by the image capturing unit 11 is input to the trained model 331. When the processing circuitry 31 determines that an elementary school student 50 is captured in the peripheral image, it obtains the position information obtained by the position information obtainment unit 12 when the peripheral image is generated by the image capturing unit 11.

Then, the processing circuitry 31 reads out from the storage unit 33 the school route information 332 of the elementary school whose school district includes the current position of the vehicle 10. Then, based on the position information obtained from the position information obtainment unit 12 and the school route information 332 read from the storage unit 33, the processing circuitry 31 determines whether the position indicated by the position information is on the school routes of the elementary school. When the processing circuitry 31 determines that the position indicated by the position information is not on the school routes of the elementary school, it determines that the elementary school student 50 is away from the school routes of the elementary school. When the processing circuitry 31 determines that the position indicated by the position information is on the school routes of the elementary school, it determines that the elementary school student 50 is on the school routes of the elementary school.

When the processing circuitry 31 determines that the elementary school student 50 is away from the school routes of the elementary school, it transmits notification information set to the server device 20 of the elementary school via the communication network 40. The notification information set transmitted to the server device 20 may include the peripheral image including the elementary school student 50 who is away from the school routes, and the position information obtained by the position information obtainment unit 12 when the peripheral image is generated by the image capturing unit 11. At this time, based on the position information included in the notification information set transmitted to the server device 20, the processing circuitry 31 identifies the elementary school whose school district includes the position indicated by the position information. Then, the processing circuitry 31 transmits a notification information set to the server device 20 of the identified elementary school.

Also, even when it is determined that elementary school students 50 are not away from the school routes of the elementary school, the processing circuitry 31 transmits a notification information set to the server device 20 when an elementary school student 50 is captured in a peripheral image generated by the image capturing unit 11 in a time period outside the school commuting time periods of the elementary school. When the processing circuitry 31 determines that an elementary school student 50 is captured in the peripheral image, it determines whether the peripheral image is generated by the image capturing unit 11 in a time period outside the school commuting time periods. The school commuting time periods include the time period for commuting to school and the time period for commuting from school. An example of the time period for commuting to school is from seven to nine in the morning. An example of the time period for commuting from school is from two to five in the evening.

Elementary school students 50 rarely go out carrying their school backpacks in a time period outside the school commuting time periods. Also, elementary school students 50 rarely go out wearing the clothing designated by their school in a time period outside the school commuting time periods. For this reason, when it is determined that an elementary school student 50 is in a peripheral image captured by the image capturing unit 11 in a time period outside the school commuting time periods, it is preferable to notify the elementary school or a staff member of the elementary school. To this end, when an elementary school student 50 is captured in a peripheral image generated by the image capturing unit 11 in a time period outside the school commuting time periods of the elementary school, the processing circuitry 31 transmits a notification information set to the server device 20 of the elementary school via the communication network 40.

Additionally, the processing circuitry 31 sends a notification information set to the server device 20 when it determines that an elementary school student 50 is captured in a peripheral image and the student 50 is in a hazardous area, even if the student 50 is not away from the school routes. Based on the peripheral image generated by the image capturing unit 11 and the position information obtained by the position information obtainment unit 12, the processing circuitry 31 determines whether the elementary school student 50 is in a hazardous area designated by the elementary school. When the processing circuitry 31 determines that an elementary school student 50 is captured in a peripheral image, it obtains the position information obtained by the position information obtainment unit 12 when the peripheral image is generated by the image capturing unit 11.

The processing circuitry 31 then reads out from the storage unit 33 the hazardous area information 333 designated by the elementary school whose school district includes the current position of the vehicle 10. Then, based on the position information obtained by the position information obtainment unit 12 and the hazardous area information 333 read from the storage unit 33, the processing circuitry 31 determines whether the position indicated by the position information is in a hazardous area. When the processing circuitry 31 determines that the position indicated by the position information is in a hazardous area, it determines that the elementary school student 50 is in a hazardous area.

When the processing circuitry 31 determines that the elementary school student 50 is in a hazardous area, it transmits a notification information set to the server device 20 of the elementary school via the communication network 40. The notification information set may include the peripheral image obtained when the image capturing unit 11 captures the elementary school student 50 in the hazardous area, and the position information obtained by the position information obtainment unit 12 when the peripheral image is generated by the image capturing unit 11.

Furthermore, the processing circuitry 31 determines, based on the sound information generated by the sound obtainment unit 13, whether a personal alarm carried by an elementary school student 50 is sounding. When the processing circuitry 31 determines that the personal alarm is sounding, it transmits an alert notification information set to the server device 20. The processing circuitry 31 determines, based on the sound information generated by the sound obtainment unit 13, whether the sound of the personal alarm carried by an elementary school student 50 is obtained. When the reference sound information 334 and the sound information generated by the sound obtainment unit 13 match, the processing circuitry 31 determines that the sound of the personal alarm carried by an elementary school student 50 is obtained. For example, the processing circuitry 31 may determine that the sound information generated by the sound obtainment unit 13 matches the reference sound information 334 when any one of the following conditions (B1) and (B2) is satisfied.

(B1) The frequency components of the sound of the sound information match the frequency components of the sound of the reference sound information 334.

(B2) The sound emission pattern of the sound information matches the sound emission pattern of the reference sound information 334.

When the processing circuitry 31 determines that the sound of the personal alarm carried by an elementary school student 50 is obtained, it transmits an alert notification information set to the server device 20 of the elementary school via the communication network 40. The alert notification information set may include a peripheral image generated by the image capturing unit 11 and the position information obtained by the position information obtainment unit 12 when the peripheral image is generated by the image capturing unit 11. The peripheral image included in the alert notification information set is a peripheral image that is generated by the image capturing unit 11 at the time when the sound of the personal alarm is obtained, and in which the elementary school student 50 carrying the personal alarm is captured.

Configuration of Server Device 20

As shown in FIG. 2, the server device 20 may include processing circuitry 21, a communication unit 22, and a storage unit 23. For example, the processing circuitry 21 may be a hardware processor such as a CPU. The hardware processor executes a program (software), enabling the processing circuitry 21 to perform various processes. The program may be stored in the storage unit 23 in advance. The storage unit 23 may be a non-transitory storage medium, such as an HDD or a flash memory. In one example, the communication unit 22 may include a communication circuit or a communication module, and transmit and receive various data to and from the controller 30 and other devices based on the control of the processing circuitry 21.

One or more information terminals 60 are connected to the server device 20. The communication unit 22 communicates with the information terminals 60 by wire or wirelessly. At this time, the server device 20 and each information terminal 60 may communicate with each other via the above-mentioned communication network 40, or may communicate with each other via another network. When the communication unit 22 and the information terminal 60 communicate wirelessly, the communication mode may be short-range wireless communication such as Wi-Fi® or Bluetooth®. The communication mode between the communication unit 22 and the information terminal 60 may be via a network such as the Internet, a WAN, a LAN, a provider terminal, a wireless communication network, a wireless base station, or a dedicated line. The information terminal 60 may be a smartphone or a tablet, for example.

When the processing circuitry 21 receives a notification information set or an alert notification information set from the controller 30, it sends the received information to the information terminal 60. Specifically, the processing circuitry 21 notifies the information terminal 60 that a notification information set or an alert notification information set has been uploaded to the server device 20. When a staff member notices the notification reaching the information terminal 60 from the server device 20 and operates the operation portion of the information terminal 60, the notification information set or the alert notification information set is downloaded from the server device 20 to the information terminal 60. The downloaded information is displayed on the display unit of the information terminal 60.

Series of Processes Performed by Controller 30

Figure 3:
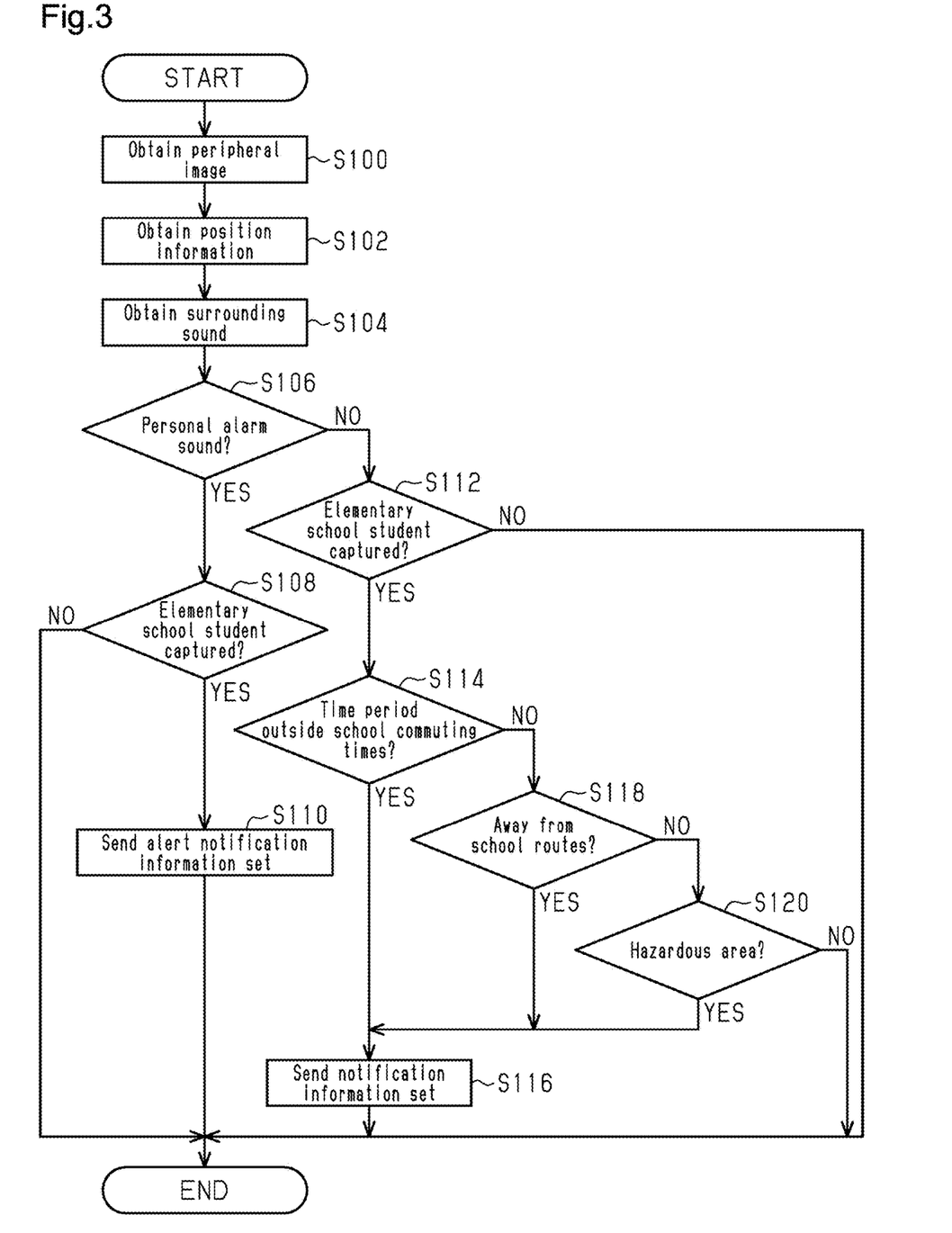
FIG. 3 is a flowchart illustrating an example of a process performed by the controller.

Referring to FIG. 3, a process performed by the controller 30 is now described. The process shown in FIG. 3 is repeated at predetermined time intervals. First, the processing circuitry 31 obtains a peripheral image generated by the image capturing unit 11 (step S100). The processing circuitry 31 then obtains position information from the position information obtainment unit 12 (step S102). The position information obtained at step S102 is the position information of the vehicle 10 at the time when the peripheral image obtained at step S100 is generated by the image capturing unit 11. The processing circuitry 31 then obtains sound information from the sound obtainment unit 13 (step S104).

The processing circuitry 31 then determines, based on the sound information obtained from the sound obtainment unit 13, whether the sound obtainment unit 13 has obtained the sound of the personal alarm carried by an elementary school student 50 (step S106). When the sound information generated by the sound obtainment unit 13 matches the reference sound information indicating the reference sound of the personal alarm, the processing circuitry 31 determines that the sound of the personal alarm is obtained. If it is determined that the sound of the personal alarm is obtained (YES at step S106), the processing circuitry 31 determines whether an elementary school student 50 is captured in the peripheral image obtained at step S100 (step S108). The processing circuitry 31 determines whether an elementary school student 50 is captured in the peripheral image based on the output variable of the trained model 331 obtained when the peripheral image obtained at step S100 is input to the trained model 331. If it is determined that the elementary school student 50 is not captured in the peripheral image (NO at step S108), the processing circuitry 31 ends the process.

If it is determined that an elementary school student 50 is captured in the peripheral image (YES at step S108), the processing circuitry 31 causes the communication unit 32 to transmit an alert notification information set to the server device 20 of the elementary school (step S110). The alert notification information set transmitted to the server device 20 at step S110 includes the peripheral image obtained at step S100 in the current iteration of the process shown in FIG. 3, and the position information obtained at step S102 in the current iteration of the process. The processing circuitry 31 then ends the process.

If it is determined that the sound of the personal alarm carried by an elementary school student 50 is not obtained (NO at step S106), the processing circuitry 31 proceeds to step S112. The processing circuitry 31 performs the same processing as at step S108 to determine whether an elementary school student 50 is captured in the peripheral image obtained at step S100 (step S112). If it is determined that an elementary school student 50 is not in the peripheral image (NO at step S112), the processing circuitry 31 ends the process since there is no information to be sent to the server device 20.

If it is determined that an elementary school student 50 is captured in the peripheral image (YES at step S112), the processing circuitry 31 determines whether the time at which the peripheral image is generated by the image capturing unit 11 is outside the school commuting time periods (step S114). If it is determined that the time at which the peripheral image is generated by the image capturing unit 11 is outside the school commuting time periods (YES at step S114), the processing circuitry 31 causes the communication unit 32 to transmit a notification information set to the server device 20 of the elementary school (step S116). The notification information set transmitted to the server device 20 at step S116 includes the peripheral image obtained at step S100 in the current iteration of the process shown in FIG. 3, and the position information obtained at step S102 in the current iteration of the process. The processing circuitry 31 then ends the process.

If it is determined that the time at which the peripheral image is generated by the image capturing unit 11 is in a school commuting time period (NO at step S114), the processing circuitry 31 determines whether the elementary school student 50 is away from the school routes (step S118). The processing circuitry 31 determines whether the elementary school student 50 is away from the school routes based on the position information obtained at step S102 and the school route information 332 of the elementary school. If it is determined that the elementary school student 50 is away from the school routes (YES at step S118), the processing circuitry 31 proceeds to step S116.

If it is determined that the elementary school student 50 is on the school routes (NO at step S118), the processing circuitry 31 determines whether the elementary school student 50 is in a hazardous area (step S120). The processing circuitry 31 determines whether the elementary school student 50 is in a hazardous area based on the position information obtained at step S102 and the hazardous area information 333. If it is determined that the elementary school student 50 is in a hazardous area (YES at step S120), the processing circuitry 31 proceeds to step S116. If it is determined that the elementary school student 50 is at a location other than a hazardous area (NO at step S120), the processing circuitry 31 ends the process.

In other words, even if it is determined that an elementary school student 50 is captured in the peripheral image obtained at step S100, the processing circuitry 31 ends the process without sending a notification information set to the server device 20 when the following three conditions (C1), (C2), and (C3) are all satisfied.

(C1) The time at which the peripheral image is generated is in a school commuting time period.

(C2) The elementary school student 50 is on the school routes.

(C3) The elementary school student 50 is at a location on the school routes other than a hazardous area.

Process Performed by Server Device 20

Figure 4:
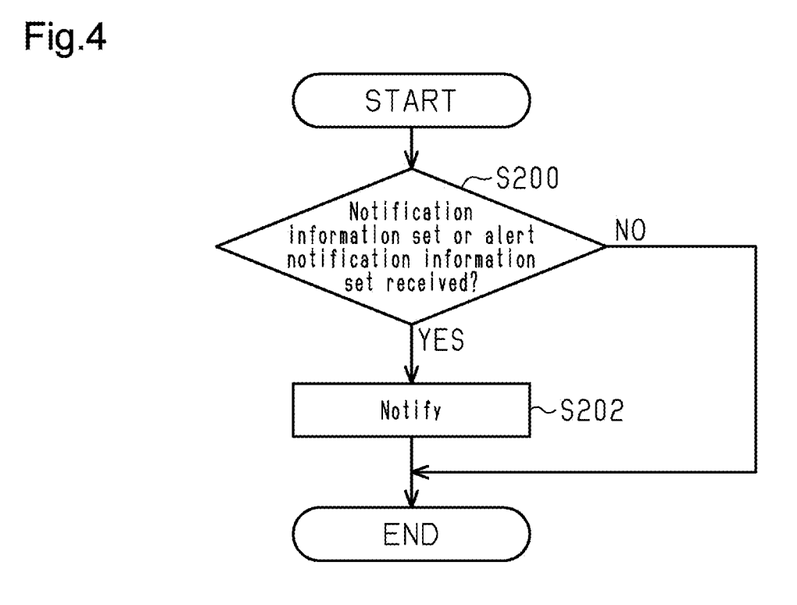
FIG. 4 is a flowchart illustrating an example of a process performed by the server device.

Referring to FIG. 4, a process performed by the server device 20 is now described. The process shown in FIG. 4 is repeated at predetermined time intervals. The processing circuitry 21 determines whether a notification information set or an alert notification information set has been received from the controller 30 (step S200). If neither a notification information set nor an alert notification information set has been received from the controller 30 (NO at step S200), the processing circuitry 21 ends the process. If a notification information set or an alert notification information set is received from the controller 30 (YES at step S200), the processing circuitry 21 notifies the information terminal 60 of the received information (step S202). Then, the processing circuitry 21 ends the process.

Operation and Advantageous Effects of Embodiment

The above embodiment has the following operation and advantageous effects.

(1) While the vehicle 10 is traveling, the image capturing unit 11 captures an image of the surroundings of the vehicle 10 to generate a peripheral image. At this time, the position information obtainment unit 12 obtains the position information of the vehicle 10 at the time when the image capturing unit 11 captures the peripheral image.

The processing circuitry 31 of the controller 30 determines whether an elementary school student 50 is captured in the peripheral image generated by the image capturing unit 11. The processing circuitry 31 transmits a notification information set to the server device 20 on the condition that the elementary school student 50 captured in the peripheral image is away from the school routes.

Upon receiving the notification information set from the vehicle 10, the server device 20 transmits the notification information set to the information terminal 60. That is, the server device 20 transmits to the information terminal 60 notification information set including a peripheral image in which an elementary school student 50 who is away from the school routes is captured, and the position information obtained when the peripheral image is generated by the image capturing unit 11.

As a result, the information processing method can notify the elementary school or the elementary school staff that the elementary school student 50 is away from the school routes even when the elementary school student 50 does not have an information terminal.

(2) When an elementary school student 50 is in a hazardous area within the school district, there is a risk that the elementary school student 50 might be involved in an accident. As such, with the information processing method, when the image capturing unit 11 captures an image of an elementary school student 50 in a hazardous area while the vehicle 10 is traveling, a notification information set including a peripheral image in which the elementary school student 50 is captured is transmitted from the controller 30 of the vehicle 10 to the server device 20. Upon receiving the notification information set from the vehicle 10, the server device 20 transmits the notification information set to the information terminal 60. That is, the server device 20 transmits to the information terminal 60 a notification information set including the peripheral image obtained when the image capturing unit 11 captures the elementary school student 50 in the hazardous area.

As a result, the information processing method allows the elementary school staff to be aware that the elementary school student 50 is in a hazardous area before the elementary school student 50 becomes involved in an accident.

(3) When an elementary school student 50 operates his or her personal alarm, there is a possibility that the elementary school student 50 is involved in an incident or accident. As such, according to the present information processing method, when the sound obtainment unit 13 obtains the sound of the personal alarm carried by an elementary school student 50 while the vehicle 10 is traveling, alert notification information set including a peripheral image showing the elementary school student 50 carrying the personal alarm is transmitted from the controller 30 of the vehicle 10 to the server device 20. Upon receiving the alert notification information set from the vehicle 10, the server device 20 transmits the alert notification information set to the information terminal 60.

This allows the elementary school staff to be aware that an elementary school student 50 may have been involved in an incident or accident. It also allows the staff to identify the area where an incident or accident may have occurred.

(4) While the vehicle 10 is traveling in a time period outside the school commuting time periods, the image capturing unit 11 of the vehicle 10 may capture an image of an elementary school student 50. An elementary school student 50 rarely goes out in a time period outside the school commuting time periods in an appearance that causes the controller 30 to determine that an elementary school student 50 is captured in a peripheral image. An elementary school student 50 who is out in such a time period could be involved in an incident. For this reason, according to the information processing method, when it is determined that an elementary school student 50 is captured in a peripheral image generated by the image capturing unit 11 of the vehicle 10 in a time period outside the school commuting time periods, the controller 30 of the vehicle 10 sends a notification information set including the peripheral image to the server device 20. Upon receiving the notification information set from the vehicle 10, the server device 20 transmits the notification information set to the information terminal 60.

In the process shown in FIG. 3, some steps do not necessarily need to be performed. For example, when the determination processing regarding the sound of the personal alarm is not performed, steps S104, S106, S108, and S110 may be omitted. In this case, step S112 is performed after step S102.

When the processing of determining whether an elementary school student 50 is out in a time period outside the school commuting time periods is not performed, for example, step S114 may be omitted. In this case, if it is determined at step S112 that an elementary school student 50 is captured in the peripheral image (YES at step S112), the processing circuitry 31 proceeds to step S118.

In the process shown in FIG. 3, the processing of determining whether the elementary school student 50 is in a time period outside the school commuting time periods has precedence over the processing of determining whether the elementary school student 50 is away from the school routes and the processing of determining whether the elementary school student 50 is in a hazardous area. However, the present disclosure is not limited to this. Any of these processing steps may be given precedence. In other words, the processing order of steps S114, S118, and S120 may be interchanged.

When an exception condition is satisfied in the processing of determining whether the elementary school student 50 is away from the school routes, the processing circuitry 31 does not need send notification information set to the information terminal 60 even if the elementary school student 50 is away from the school routes. The exception condition may include that the elementary school student 50 is on a route used to travel from home to an after-school care center. In this case, the storage unit 33 stores after-school route information in which an elementary school is associated with position information indicating routes used by elementary school students 50 who attend the elementary school to travel from home to after-school care centers. When the processing circuitry 31 determines that an elementary school student 50 is captured in a peripheral image, it obtains the position information obtained by the position information obtainment unit 12 when the peripheral image is generated by the image capturing unit 11. The processing circuitry 31 then reads out from the storage unit 33 the after-school route information corresponding to the elementary school whose school district includes the current position of the vehicle 10. Then, based on the position information obtained by the position information obtainment unit 12 and the after-school route information read from the storage unit 33, the processing circuitry 31 determines whether the position indicated by the position information is on the routes used by elementary school students 50 to travel from home to the after-school care centers. When it is determined that the position indicated by the position information is on the routes used by elementary school students 50 to travel from home to the after-school care centers, the processing circuitry 31 does not transmit a notification information set to the server device 20 even if the elementary school student 50 is away from the school routes. This configuration reduces the likelihood of unnecessary issuance of a notification information set by the information terminal 60 for an elementary school student 50 who attends after-school care after the elementary school.

In the above description, the processing circuitry 31 determines whether the personal alarm carried by an elementary school student 50 is sounding based on the reference sound information 334 and the sound information generated by the sound obtainment unit 13, but the present disclosure is not limited to this. The processing circuitry 31 may use a trained model that has undergone machine learning using sound information of the personal alarm carried by an elementary school student 50 to determine whether the personal alarm carried by an elementary school student 50 is sounding. For example, when sound information is input, the trained model outputs whether the personal alarm is sounding. The processing circuitry 31 inputs the sound information generated by the sound obtainment unit 13 into the trained model, and determines whether the personal alarm carried by an elementary school student 50 is sounding based on the output of the trained model.

Instead of using the trained model 331 to determine whether an elementary school student 50 is captured in a peripheral image, the processing circuitry 31 may determine whether an elementary school student 50 is in a peripheral image based on the result obtained by general image analysis.

The image capturing unit 11 may be a stereo camera. The image capturing unit 11 may include multiple cameras (such as a first camera and a second camera) and capture images of the same direction using multiple cameras. The image capturing unit 11 may also capture images using the first camera under normal circumstances, and capture images using the second camera or both the first and second cameras when predetermined conditions are met. Alternatively, the first camera may capture images of the area near the image capturing unit 11, and the second camera may capture images of the area distant from the image capturing unit 11.

The image capturing unit 11 may be attached to any position of the vehicle 10 as long as it can capture an image of the surroundings of the vehicle 10 and generate a peripheral image. For example, to capture an image of the rear of the vehicle 10, the image capturing unit 11 may be attached to the upper unit of the rear windshield, the back door, or the like. Furthermore, to capture images of the sides and rear sides of the vehicle 10, the image capturing unit 11 may be attached to a door mirror or the like.

The position information obtained by the position information obtainment unit 12 may be identified or supplemented by an inertial navigation system (INS), which uses outputs from various sensors equipped in the vehicle 10.

The school route information 332 and the hazardous area information 333 may be updated successively according to the traveling position of the vehicle 10. For example, the controller 30 transmits the position information obtained by the position information obtainment unit 12 to an information providing server of the information processing system 1. The information providing server identifies the school district of the received position information, and transmits to the controller 30 the school route information 332 or the hazardous area information 333 corresponding to the identified elementary school. The controller 30 performs various determination steps based on the received school route information 332 or hazardous area information 333, and transmits a notification information set or an alert notification information set to the server device 20 of the corresponding elementary school.

The manner in which the information terminal 60 issues a notification information set and an alert notification information set is not limited to displaying on the display unit. The information terminal 60 may be a controller that controls the public address system of the elementary school. In this case, the information terminal 60 may use the school public address system to provide the elementary school staff with audio indicating that an elementary school student 50 is at the position of the position information in the notification information set or the alert notification information set.

As long as the server device 20 is installed outside the vehicle 10, it may be installed at a position other than an elementary school. For example, the server device 20 may be installed in the business facilities of a business entity that provides the information processing system 1, or in a facility that manages elementary schools, such as a city hall. Furthermore, the server device 20 does not need to be provided for each elementary school. In this case, the server device 20 identifies the corresponding elementary school based on the position information included in the notification information set or the alert notification information set received from the controller 30. The server device 20 notifies the information terminal 60 installed in the identified elementary school and the information terminal 60 of a staff member belonging to the elementary school of the notification information set or the alert notification information set.

In the above description, the processing circuitry 31 performs various determination steps based on the peripheral image generated by the image capturing unit 11, but the present disclosure is not limited to this. A portion of the various determination steps performed by the processing circuitry 31 may be performed by the processing circuitry 21 of the server device 20. In this case, the processing circuitry 31 associates a peripheral image that is generated by the image capturing unit 11 and in which an elementary school student 50 is captured with the position information obtained by the position information obtainment unit 12 when the peripheral image is generated by the image capturing unit 11, and transmits them to the server device 20. The processing circuitry 21 performs various determination steps based on the peripheral image and the position information received from the controller 30. For example, based on the received position information, the processing circuitry 21 determines whether the elementary school student 50 captured in the peripheral image is away from the school routes. When determining that the elementary school student 50 captured in the peripheral image is away from the school routes, the processing circuitry 21 transmits to the information terminal 60 a notification information set including the peripheral image and the position information associated with the peripheral image. In this case, unlike the above embodiment, the server device 20 does not need to provide the vehicle 10 with the school route information 332.

In another example, based on the peripheral image and the position information received from the controller 30, the processing circuitry 21 determines whether the elementary school student 50 captured in the peripheral image is in a hazardous area within the school district. When determining that the elementary school student 50 captured in the peripheral image is in a hazardous area, the processing circuitry 21 transmits to the information terminal 60 a notification information set including the peripheral image in which the elementary school student 50 is captured and the position information associated with the peripheral image. In this case, unlike the above embodiment, the server device 20 does not need to provide the vehicle 10 with the hazardous area information 333.

In another example, when the controller 30 of the vehicle 10 determines that a person, not limited to an elementary school student, is captured in a peripheral image, the controller 30 may associate the peripheral image with the position information of the vehicle 10 obtained when the peripheral image is generated, and transmit them to the server device 20. In this case, the processing circuitry 21 of the server device 20 determines whether an elementary school student 50 is captured in the peripheral image by inputting the received peripheral image into the trained model 331, for example. When determining that an elementary school student 50 is captured in the peripheral image, the processing circuitry 21 may sequentially perform the process from step S112 shown in FIG. 3.

When the personal alarm carried by an elementary school student 50 is sounding, instead of transmitting an alert notification information set to the server device 20, the processing circuitry 31 may transmit a notification information set. In this case, the notification information set may at least include a peripheral image in which the elementary school student 50 carrying the personal alarm is captured, and the position information obtained by the position information obtainment unit 12 when the peripheral image is generated by the image capturing unit 11.

Some or all of the constituent elements the processing circuitry 21 and the processing circuitry 31 may be implemented by hardware (including circuitry) such as a large scale integration (LSI), an application specific integrated circuit (ASIC), a field-programmable gate array (FPGA), or a graphics processing unit (GPU), or may be implemented by cooperation of software and hardware.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An information processing method to be performed using an information processing system, wherein
the information processing system includes:
vehicles; and
a server device installed outside the vehicles;
the vehicles each include:
an image capturing unit that captures an image of surroundings to generate a peripheral image;
a position information obtainment unit that obtains position information of the vehicle; and
a communication unit that performs external communication,
the information processing system is configured such that the peripheral image and the position information are transmitted from the communication unit of each vehicle to the server device via a communication network,
the information processing method comprises:
transmitting, using the communication unit of each vehicle, a notification information set to the server device, the notification information set including the peripheral image in which an elementary school student is captured, and position information of the vehicle obtained when the peripheral image is generated by the image capturing unit; and
sending, using the server device, at least one notification information set among the notification information sets to at least one of an information terminal belonging to an elementary school and an information terminal belonging to a staff member of the elementary school, the at least one notification information set including the peripheral image in which an elementary school student who is away from a school route of the elementary school is captured, and the position information of the vehicle obtained when the peripheral image is generated by the imaging unit.

2. The information processing method according to claim 1, further comprising sending, using the server device, at least one notification information set among the notification information sets to at least one of the information terminal belonging to the elementary school and the information terminal belonging to a staff member of the elementary school, the at least one notification information set including the peripheral image in which an elementary school student who is in a hazardous area within a school district of the elementary school is captured, and the position information of the vehicle obtained when the peripheral image is generated by the image capturing unit.

3. The information processing method according to claim 1, wherein
    each vehicle further includes a sound obtainment unit that obtains surrounding sounds,
    the information processing method further comprises:
    in response to the sound obtainment unit obtaining a sound of a personal alarm carried by an elementary school student, transmitting, using the communication unit of the vehicle, an alert notification information set to the server device, the alert notification information set including the peripheral image in which the elementary school student is captured and the position information of the vehicle obtained when the peripheral image is generated by the image capturing unit; and
    in response to the server device receiving the alert notification information set, sending, using the server device, the alert notification information set to at least one of the information terminal belonging to the elementary school and the information terminal belonging to a staff member of the elementary school.

4. The information processing method according to claim 1, further comprising sending, using processing circuitry of the server device, at least one notification information set among the notification information sets to at least one of the information terminal belonging to the elementary school and the information terminal belonging to a staff member of the elementary school, the at least one notification information set including the peripheral image that is generated by the image capturing unit in a time period outside school commuting time periods of the elementary school and in which an elementary school student is captured, and position information of the vehicle obtained when the peripheral image is generated by the image capturing unit.

* * * * *